US012772192B2

(12) United States Patent
Khare et al.

(10) Patent No.: US 12,772,192 B2
(45) Date of Patent: Oct. 20, 2026

(54) METHOD, APPARATUS AND COMPUTER PROGRAM

(71) Applicant: Nokia Technologies Oy, Espoo (FI)

(72) Inventors: Saurabh Khare, Bangalore (IN); Bruno Landais, Pleumeur-Bodou (FR)

(73) Assignee: Nokia Technologies Oy, Espoo (FI)

(*) Notice: Subject to any disclaimer, the term of this patent is extended or adjusted under 35 U.S.C. 154(b) by 489 days.

(21) Appl. No.: 18/250,139

(22) PCT Filed: Oct. 22, 2020

(86) PCT No.: PCT/EP2020/079742
§ 371 (c)(1),
(2) Date: Apr. 21, 2023

(87) PCT Pub. No.: WO2022/083867
PCT Pub. Date: Apr. 28, 2022

(65) Prior Publication Data
US 2023/0413214 A1 Dec. 21, 2023

(51) Int. Cl.
*H04W 60/04* (2009.01)
*H04L 43/10* (2022.01)

(52) U.S. Cl.
CPC ............. *H04W 60/04* (2013.01); *H04L 43/10* (2013.01)

(58) Field of Classification Search
CPC ...... H04W 60/04; H04W 88/14; H04L 43/10; H04L 67/51; H04L 41/5058; H04L 61/4511
See application file for complete search history.

(56) References Cited

U.S. PATENT DOCUMENTS

| | | | | |
|---|---|---|---|---|
| 10,856,158 | B2 * | 12/2020 | Mendoza | H04L 67/1095 |
| 10,887,751 | B1 * | 1/2021 | Cakulev | H04W 4/029 |
| 11,271,846 | B2 * | 3/2022 | Krishan | H04L 47/125 |
| 2017/0303259 | A1 | 10/2017 | Lee et al. | |

(Continued)

FOREIGN PATENT DOCUMENTS

| | | | | | |
|---|---|---|---|---|---|
| CN | 111314944 | A * | 6/2020 | H04W 60/00 |
| WO | WO-2020038151 | A1 * | 2/2020 | H04L 45/02 |

(Continued)

OTHER PUBLICATIONS

"3rd Generation Partnership Project; Technical Specification Group Core Network and Terminals; Numbering, addressing and identification; (Release 16)", 3GPP TS 23.003, V16.3.0, Jun. 2020, pp. 1-141.

(Continued)

*Primary Examiner* — Cheikh T Ndiaye
(74) *Attorney, Agent, or Firm* — Nokia Technologies Oy

(57) ABSTRACT

There is provided an apparatus, said apparatus comprising means for, at a network repository function, NRF, receiving, from a NRF consumer, a registration request comprising first information, determining, based on the first information, a preferred NRF instance for the NRF consumer and at least one backup NRF instance for use by the NRF consumer if the preferred NRF instance is unreachable and providing an indication of the determined preferred NRF and an indication of the determined at least one backup NRF to the NRF consumer.

15 Claims, 7 Drawing Sheets

(56) References Cited

U.S. PATENT DOCUMENTS

2020/0389935 A1 * 12/2020 Jeong .................... H04W 24/04

FOREIGN PATENT DOCUMENTS

WO 2020/104446 A2 5/2020
WO WO-2021194471 A1 * 9/2021 ............. H04L 69/40

OTHER PUBLICATIONS

3rd Generation Partnership Project; Technical Specification Group Core Network and Terminals; 5G System; Technical Realization of Service Based Architecture; Stage 3 (Release 16), 3GPP TS 29.500, V16.4.0, Jun. 2020, pp. 1-79.
"Ultra Cloud Core 5G Session Management Function, Release Feb. 2020—Configuration and Administration Guide", Cisco, Retrieved on May 21, 2023, Webpage available at : https://www.cisco.com/c/en/us/td/docs/wireless/ucc/smf/b_SMF/b_SMF_chapter_011100.html#id_119622.
"5G; 5G System; Network function repository services; Stage 3 (3GPP TS 29.510 version 15.1.0 Release 15)", ETSI TS 129 510, V15.1.0, Oct. 2018, 87 pages.
International Search Report and Written Opinion received for corresponding Patent Cooperation Treaty Application No. PCT/EP2020/079742, dated Jun. 25, 2021, 13 pages.
"3rd Generation Partnership Project; Technical Specification Group Services and System Aspects; Procedures for the 5G System (5GS); Stage 2 (Release 16)", 3GPP TS 23.502, V16.6.0, Sep. 2020, pp. 1-597.
"3rd Generation Partnership Project; Technical Specification Group Services and System Aspects; System architecture for the 5G System (5GS); Stage 2 (Release 16)", 3GPP TS 23.501, V16.6.0, Sep. 2020, pp. 1-447.
"Preferred API Version", 3GPP TSG-CT WG4 Meeting #95, C4-195602, Ericsson, Nov. 11-15, 2019, 17 pages.

* cited by examiner

METHOD, APPARATUS AND COMPUTER PROGRAM

RELATED APPLICATION

This application was originally filed as PCT Application No. PCT/EP2020/079742, filed on Oct. 22, 2020, which is incorporated herein by reference in its entirety.

FIELD

The present application relates to a method, apparatus, and computer program and in particular but not exclusively to enhanced NRF failure detection and recovery.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices (also referred to as station or user equipment) and/or application servers. The communication sessions may comprise, for example, communication of data for carrying communications such as voice, video, electronic mail (email), text message, multimedia, content data, time-sensitive network (TSN) flows and/or data in an industrial application such as critical system messages between an actuator and a controller, critical sensor data (such as measurements, video feed etc.) towards a control system and so on. Non-limiting examples of services provided comprise two-way or multi-way calls, data communication or multimedia services and access to a data network system, such as the Internet.

In a wireless communication system at least a part of a communication session, for example, between at least two stations or between at least one station and at least one application server (e.g. for video), occurs over a wireless link. Examples of wireless systems comprise public land mobile networks (PLMN) operating based on 3GPP radio standards such as E-UTRA, New Radio, satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access one or more carriers provided by the network, for example a base station of a cell, and transmit and/or receive communications on the one or more carriers. In carrier aggregation (CA) two or more carriers are combined into one channel. In dual connectivity (DC), two carriers from different sites are combined, that is a user equipment may be dual (or multi) connected to two (or more) sites.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) based on the E-UTRAN radio-access technology, and so-called 5G system (5GS) including the 5G or next generation core (NGC) and the 5G Access network based on the New Radio (NR) radio-access technology. 5GS including NR are being standardized by the 3rd Generation Partnership Project (3GPP).

SUMMARY

In a first aspect there is provided an apparatus, said apparatus comprising means for, at a network repository function, NRF, receiving, from a NRF consumer, a registration request comprising first information, determining, based on the first information, a preferred NRF instance for the NRF consumer and at least one backup NRF instance for use by the NRF consumer if the preferred NRF instance is unreachable and providing an indication of the determined preferred NRF and an indication of the determined at least one backup NRF to the NRF consumer.

The NRF consumer may comprises a network function, NF, or a service communication proxy, SCP.

The first information may comprise at least one of an indication of the locality or geographical location of the NRF consumer, an indication of the data centre of the NRF consumer, an indication of the network slice of the NRF consumer and an indication of the NRF consumer type.

The apparatus may comprise means for providing the indication of the determined preferred NRF and the indication of the determined at least one backup NRF to the NRF consumer in a hypertext transfer protocol header.

The indication of the determined preferred NRF and the indication of the determined at least one backup NRF may comprise a fully qualified domain name.

The indication of the determined preferred NRF and the indication of the determined at least one backup NRF may comprise an identifier of an NRF set comprising the preferred NRF and the at least one backup NRF.

The apparatus may comprise means for receiving at the NRF from the NRF consumer, at least one of a NRF consumer profile registration update and a heartbeat request and in response to the at least one of a NRF consumer profile registration update and a heartbeat request, providing the indication of the determined preferred NRF and the indication of the determined backup NRF to the NRF consumer.

The preferred and backup NRFs may share the NRF consumer profile data of the NRF consumers registered via any of the preferred and backup NRFs.

In a second aspect there is provided an apparatus comprising means for providing, to a network repository function, NRF, from an NRF consumer, a registration request comprising first information and receiving, at the NRF consumer from the NRF, an indication of a preferred NRF instance for the NRF consumer and an indication of at least one backup NRF instance for use by the NRF consumer if the preferred NRF instance is unreachable.

The apparatus may comprise means for receiving the indication of the determined preferred NRF and the indication of the determined at least one backup NRF from the NRF at the NRF consumer in a hypertext transfer protocol header.

The indication of the determined preferred NRF and the indication of the determined at least one backup NRF may comprise a fully qualified domain name.

The indication of the determined preferred NRF and the indication of the determined at least one backup NRF may comprise an identifier of an NRF set comprising the preferred NRF and the at least one backup NRF.

The apparatus may comprise means for providing at least one of a heartbeat request and a NRF consumer profile registration update from the NRF consumer to the preferred NRF.

The apparatus may comprise means for determining that the preferred NRF is unreachable and providing further at least one of a heartbeat request and a NRF consumer profile registration update from the NRF consumer to the at least one backup NRF.

The apparatus may comprise means for receiving an indication at the NRF consumer from the at least one back up NRF of a further backup NRF in response to the further at least one of a heartbeat request and a NRF consumer profile registration update.

The apparatus may comprise means for, in response to the further at least one of a NRF consumer profile registration updates and a heartbeat request, receiving at the NRF consumer a further indication of a further preferred NRF from the at least one backup NRF and providing at least one of a subsequent NRF consumer profile registration update and a subsequent heartbeat request from the NRF consumer to the preferred NRF.

The apparatus may comprise means for, in response to the further at least one of a NRF consumer profile registration update and a heartbeat request, receiving a further indication of the preferred NRF from the at least one backup NRF at the NRF consumer so that the NRF consumer is aware that the preferred NRF has become reachable and providing at least one of a subsequent NRF consumer profile registration update and a subsequent heartbeat request to the preferred NRF from the NRF consumer.

In a third aspect there is provided a method comprising, at a network repository function, NRF, receiving, from a NRF consumer, a registration request comprising first information, determining, based on the first information, a preferred NRF instance for the NRF consumer and at least one backup NRF instance for use by the NRF consumer if the preferred NRF instance is unreachable and providing an indication of the determined preferred NRF and an indication of the determined at least one backup NRF to the NRF consumer.

The NRF consumer may comprises a network function, NF, or a service communication proxy, SCP.

The first information may comprise at least one of an indication of the locality or geographical location of the NRF consumer, an indication of the data centre of the NRF consumer, an indication of the network slice of the NRF consumer and an indication of the NRF consumer type.

The method may comprise providing the indication of the determined preferred NRF and the indication of the determined at least one backup NRF to the NRF consumer in a hypertext transfer protocol header.

The indication of the determined preferred NRF and the indication of the determined at least one backup NRF may comprise a fully qualified domain name.

The indication of the determined preferred NRF and the indication of the determined at least one backup NRF may comprise an identifier of an NRF set comprising the preferred NRF and the at least one backup NRF.

The method may comprise receiving at the NRF from the NRF consumer, at least one of a NRF consumer profile registration update and a heartbeat request and in response to the at least one of a NRF consumer profile registration update and a heartbeat request, providing the indication of the determined preferred NRF and the indication of the determined backup NRF to the NRF consumer.

The preferred and backup NRFs may share the NRF consumer profile data of the NRF consumers registered via any of the preferred and backup NRFs.

In a fourth aspect there is provided a method comprising providing, to a network repository function, NRF, from an NRF consumer, a registration request comprising first information and receiving, at the NRF consumer from the NRF, an indication of a preferred NRF instance for the NRF consumer and an indication of at least one backup NRF instance for use by the NRF consumer if the preferred NRF instance is unreachable.

The method may comprise receiving the indication of the determined preferred NRF and the indication of the determined at least one backup NRF from the NRF at the NRF consumer in a hypertext transfer protocol header.

The indication of the determined preferred NRF and the indication of the determined at least one backup NRF may comprise a fully qualified domain name.

The indication of the determined preferred NRF and the indication of the determined at least one backup NRF may comprise an identifier of an NRF set comprising the preferred NRF and the at least one backup NRF.

The method may comprise providing at least one of a heartbeat request and a NRF consumer profile registration update from the NRF consumer to the preferred NRF.

The method may comprise determining that the preferred NRF is unreachable and providing further at least one of a heartbeat request and NRF consumer profile registration update from the NRF consumer to the at least one backup NRF.

The method may comprise receiving an indication at the NRF consumer from the at least one back up NRF of a further backup NRF in response to the further at least one of a heartbeat request and NRF consumer profile registration update.

The method may comprise, in response to the further at least one of a NRF consumer profile registration update and a heartbeat request, receiving at the NRF consumer a further indication of a further preferred NRF from the at least one backup NRF and providing at least one of a subsequent NRF consumer profile registration update and a subsequent heartbeat request to the further preferred NRF.

The method may comprise, in response to the at least one of a NRF consumer profile registration update and a heartbeat request, receiving a further indication of the preferred NRF from the at least one backup NRF at the NRF consumer so that the NRF consumer is aware that the preferred NRF has become reachable and providing at least one of a subsequent NRF consumer profile registration update and a subsequent heartbeat request to the preferred NRF from the NRF consumer.

In a fifth aspect there is provided an apparatus comprising: at least one processor and at least one memory including a computer program code, the at least one memory and computer program code configured to, with the at least one processor, cause the apparatus at least to, at a network repository function, NRF receive, from a NRF consumer, a registration request comprising first information, determine, based on the first information, a preferred NRF instance for the NRF consumer and at least one backup NRF instance for use by the NRF consumer if the preferred NRF instance is unreachable and provide an indication of the determined preferred NRF and an indication of the determined at least one backup NRF to the NRF consumer.

The NRF consumer may comprises a network function, NF, or a service communication proxy, SCP.

The first information may comprise at least one of an indication of the locality or geographical location of the NRF consumer, an indication of the data centre of the NRF consumer, an indication of the network slice of the NRF consumer and an indication of the NRF consumer type.

The apparatus may be configured to provide the indication of the determined preferred NRF and the indication of the determined at least one backup NRF to the NRF consumer in a hypertext transfer protocol header.

The indication of the determined preferred NRF and the indication of the determined at least one backup NRF may comprise a fully qualified domain name.

The indication of the determined preferred NRF and the indication of the determined at least one backup NRF may comprise an identifier of an NRF set comprising the preferred NRF and the at least one backup NRF.

The apparatus may be configured to receive at the NRF from the NRF consumer, at least one of a NRF consumer profile registration update and a heartbeat request and in response to the at least one of a NRF consumer profile registration updates and a heartbeat request, provide the indication of the determined preferred NRF and the indication of the determined backup NRF to the NRF consumer.

The preferred and backup NRFs may share the NRF consumer profile data of the NRF consumers registered via any of the preferred and backup NRFs.

In a sixth aspect there is provided an apparatus comprising: at least one processor and at least one memory including a computer program code, the at least one memory and computer program code configured to, with the at least one processor, cause the apparatus at least to: provide, to a network repository function, NRF, from an NRF consumer, a registration request comprising first information and receive, at the NRF consumer from the NRF, an indication of a preferred NRF instance for the NRF consumer and an indication of at least one backup NRF instance for use by the NRF consumer if the preferred NRF instance is unreachable.

The apparatus may be configured to receive the indication of the determined preferred NRF and the indication of the determined at least one backup NRF from the NRF at the NRF consumer in a hypertext transfer protocol header.

The indication of the determined preferred NRF and the indication of the determined at least one backup NRF may comprise a fully qualified domain name.

The indication of the determined preferred NRF and the indication of the determined at least one backup NRF may comprise an identifier of an NRF set comprising the preferred NRF and the at least one backup NRF.

The apparatus may be configured to provide at least one of a heartbeat request and a NRF consumer profile registration update from the NRF consumer to the preferred NRF.

The apparatus may be configured to determine that the preferred NRF is unreachable and provide further at least one of a heartbeat request and a NRF consumer profile registration update from the NRF consumer to the at least one backup NRF.

The apparatus may be configured to receive an indication at the NRF consumer from the at least one back up NRF of a further backup NRF in response to the further at least one of a heartbeat request and a NRF consumer profile registration update.

The apparatus may be configured to, in response to the further at least one of a NRF consumer profile registration update and a heartbeat request, receive at the NRF consumer a further indication of a further preferred NRF from the at least one backup NRF and provide at least one of a subsequent NRF consumer profile registration update and a subsequent heartbeat request from the NRF consumer to the further preferred NRF.

The apparatus may be configured to, in response to the at least one of a NRF consumer profile registration update and a heartbeat request, receiving a further indication of the preferred NRF from the at least one backup NRF at the NRF consumer so that the NRF consumer is aware that the preferred NRF has become reachable and provide at least one of a subsequent NRF consumer profile registration update and a subsequent heartbeat request to the preferred NRF from the NRF consumer.

In a seventh aspect there is provided a computer readable medium comprising program instructions for causing an apparatus to perform at least the following at a network repository function, NRF, receiving, from a NRF consumer, a registration request comprising first information, determining, based on the first information, a preferred NRF instance for the NRF consumer and at least one backup NRF instance for use by the NRF consumer if the preferred NRF instance is unreachable and providing an indication of the determined preferred NRF and an indication of the determined at least one backup NRF to the NRF consumer.

The NRF consumer may comprises a network function, NF, or a service communication proxy, SCP.

The first information may comprise at least one of an indication of the locality or geographical location of the NRF consumer, an indication of the data centre of the NRF consumer, an indication of the network slice of the NRF consumer and an indication of the NRF consumer type.

The apparatus may be caused to perform providing the indication of the determined preferred NRF and the indication of the determined at least one backup NRF to the NRF consumer in a hypertext transfer protocol header.

The indication of the determined preferred NRF and the indication of the determined at least one backup NRF may comprise a fully qualified domain name.

The indication of the determined preferred NRF and the indication of the determined at least one backup NRF may comprise an identifier of an NRF set comprising the preferred NRF and the at least one backup NRF.

The apparatus may be caused to perform receiving at the NRF from the NRF consumer, at least one of a NRF consumer profile registration update and a heartbeat request and in response to the at least one of a NRF consumer profile registration updates and a heartbeat request, providing the indication of the determined preferred NRF and the indication of the determined backup NRF to the NRF consumer.

The preferred and backup NRFs may share the NRF consumer profile data of the NRF consumers registered via any of the preferred and backup NRFs.

In an eighth aspect there is provided a computer readable medium comprising program instructions for causing an apparatus to perform at least the following providing, to a network repository function, NRF, from an NRF consumer, a registration request comprising first information and receiving, at the NRF consumer from the NRF, an indication of a preferred NRF instance for the NRF consumer and an indication of at least one backup NRF instance for use by the NRF consumer if the preferred NRF instance is unreachable.

The apparatus may be caused to perform receiving the indication of the determined preferred NRF and the indication of the determined at least one backup NRF from the NRF at the NRF consumer in a hypertext transfer protocol header.

The indication of the determined preferred NRF and the indication of the determined at least one backup NRF may comprise a fully qualified domain name.

The indication of the determined preferred NRF and the indication of the determined at least one backup NRF may comprise an identifier of an NRF set comprising the preferred NRF and the at least one backup NRF.

The apparatus may be caused to perform providing at least one of a heartbeat request and a NRF consumer profile registration update from the NRF consumer to the preferred NRF.

The apparatus may be caused to perform determining that the preferred NRF is unreachable and providing further at least one of a heartbeat request and NRF consumer profile registration update from the NRF consumer to the at least one backup NRF.

The apparatus may be caused to perform receiving an indication at the NRF consumer from the at least one back up NRF of a further backup NRF in response to the further at least one of a heartbeat request and a NRF consumer profile registration update.

The apparatus may be caused to perform, in response to the further at least one of a NRF consumer profile registration update and a heartbeat request, receiving a further indication of a further preferred NRF from the at least one backup NRF and providing at least one of a subsequent NRF consumer profile registration update and a subsequent heartbeat request to the further preferred NRF.

The apparatus may be caused to perform, in response to the at least one of a NRF consumer profile registration update and a heartbeat request, receiving a further indication of the preferred NRF from the at least one backup NRF at the NRF consumer so that the NRF consumer is aware that the preferred NRF has become reachable and providing at least one of a subsequent NRF consumer profile registration update and a subsequent heartbeat request to the preferred NRF from the NRF consumer.

In a ninth aspect there is provided a non-transitory computer readable medium comprising program instructions for causing an apparatus to perform at least the method according to the third aspect or a method according to the fourth aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 3 to assist in understanding the technology underlying the described examples.

An example of a suitable communications system is the 5G System (5GS). Network architecture in 5GS may be similar to that of LTE-advanced. Base stations of NR systems may be known as next generation Node Bs (gNBs). Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Figure 1:
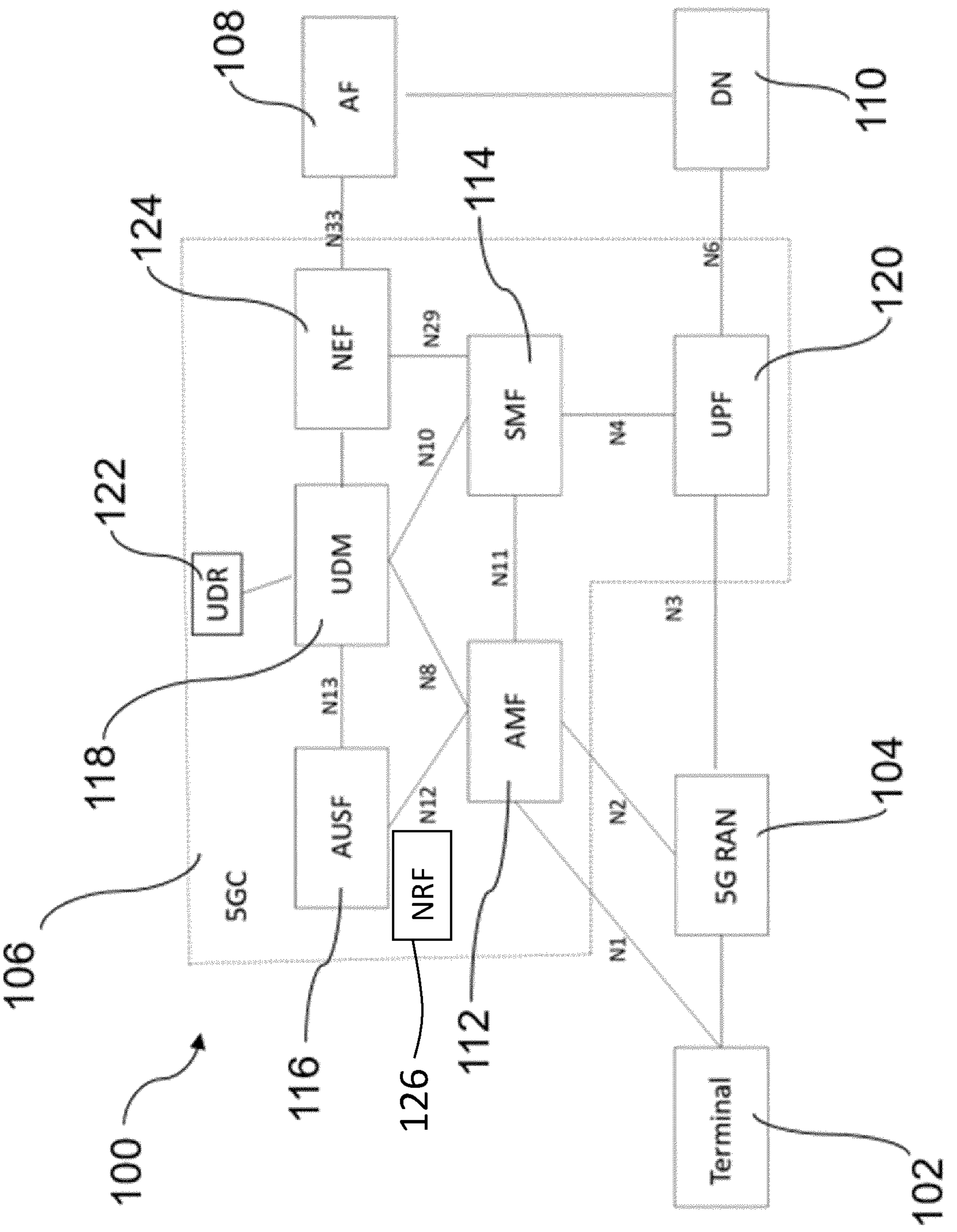
FIG. 1 shows a schematic diagram of an example 5G system.

FIG. 1 shows a schematic representation of a 5G system (5GS) 100. The 5GS may comprise a user equipment (UE) 102 (which may also be referred to as a communication device or a terminal), a 5G radio access network (5GRAN) 104, a 5G core network (5GCN) 106, one or more application functions (AF) 108 and one or more data networks (DN) 110.

An example 5G core network (CN) comprises functional entities. The 5GCN 106 may comprise one or more access and mobility management functions (AMF) 112, one or more session management functions (SMF) 114, an authentication server function (AUSF) 116, a unified data management (UDM) 118, one or more user plane functions (UPF) 120, a unified data repository (UDR) 122, a network exposure function (NEF) 124 and/or a network repository function (NRF) 126. The UPF is controlled by the SMF (Session Management Function) that receives policies from a PCF (Policy Control Function).

The CN is connected to a UE via the radio access network (RAN). The 5GRAN may comprise one or more gNodeB (GNB) distributed unit functions connected to one or more gNodeB (GNB) centralized unit functions. The RAN may comprise one or more access nodes.

An UPF (User Plane Function) whose role is called PSA (PDU Session Anchor) may be responsible for forwarding frames back and forth between the DN (data network) and the tunnels established over the 5G towards the UE(s) exchanging traffic with the DN.

Figure 2:
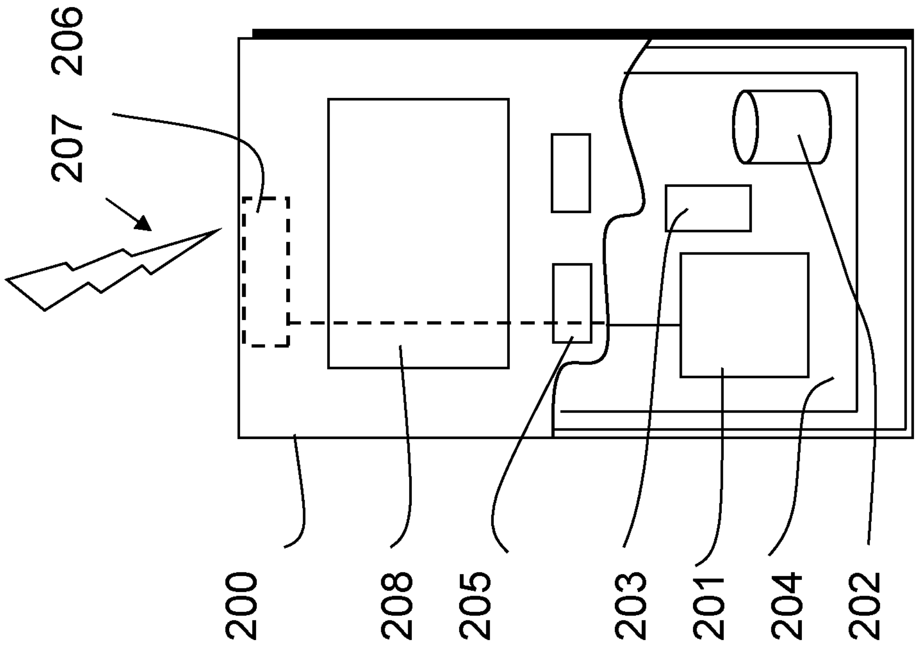
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
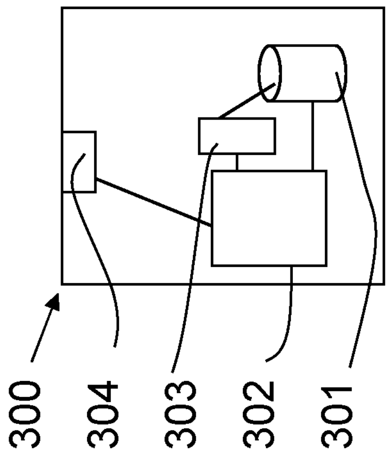
FIG. 3 shows a schematic diagram of an example control apparatus.

FIG. 3 shows an example embodiment of a control apparatus for a communication system, for example to be coupled to and/or for controlling a station of an access system, such as a RAN node, e.g. a base station, eNB or gNB, a relay node or a core network function such as AMF/SMF, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

A network repository function (NRF) supports the services registration and discovery function. It is able to receive an NF Register Request from an NF instance producing services, and an NF Discovery Request from a NF instance consuming services and can provide information about discovered NF instances. There may be multiple NRFs in the same PLMN, and some NRFs may also be dedicated to certain network slice or shared between network slices.

A NRF consumer such as a network function (NF) or a Service Communication Proxy (SCP) is configured with NRF address (IP or fqdn) which is used for different communication with NRFs. NFs may also build the FQDN on its own to access a PLMN NRF (see clause 28.3.2.3 of TS 23.003). The NF is configured with local site NRF of the same PLMN so that latency can be optimized. NF communicates preferentially with local site NRFs (e.g., to optimize latency). If something goes wrong with the local site NRF, the NF may use other sites' NRF for communications. The other site NRFs should be used temporarily and the NF should come back to the local site NRF when it is up and running. This procedure is not standardized, so each operator/vendor has a proprietary implementation.

For example, where a network has one primary NRF and other secondary NRFs (local site's NRF is called primary NRF and the other site's NRFs are known as secondary NRFs), the NFs connect to the primary NRF first. If the primary NRF goes down, then NFs switch to secondary NRFs and re-register their NF Profiles. The NFs send a dummy message to the primary NRF to check if the primary NRF is up or not. Once the primary NRF is up and running, the NFs switch back to the primary NRF. The dummy message may be sent every x seconds (where x is configurable), to check if the primary NRF is up or not.

Every 5GC NF or SCP needs to be configured with the addresses of multiple NRFs (and different ones depending e.g. on the location of every NF). One NRF is a primary NRF which is a local site NRF and the other NRFs are secondary or other sites NRFs.

Figure 4:
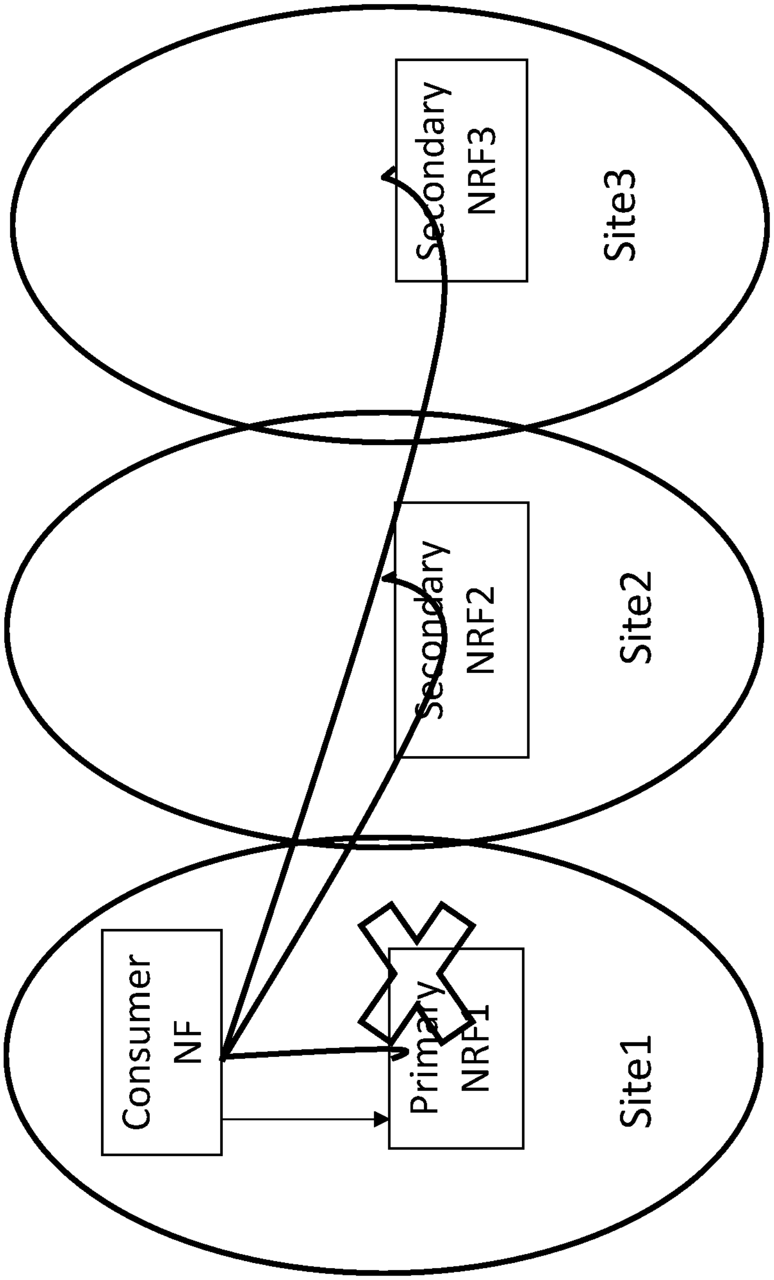
FIG. 4 shows a schematic diagram of a primary NRF and secondary NRFs.

FIG. 4 shows an example scenario where a NF is configured with 3 NRF addresses (NRF1, NRF2, and NRF3). NRF1 is configured as the primary NRF (local site), and other NRFs are configured as 2nd and 3rd NRFs. NF connects to NRF1. If NRF1 is down, then the NF may connect to NRF2 or NRF3.

Currently, in 3GPP, there is no specific procedure defined where an NRF consumer can detect when a primary NRF (NRF1) is up or not and back into service when it has been down.

Further, no procedure exists to optimize the selection of the NRF instance when multiple NRF instances are available, e.g. based on the locality or Data Center of the registering NF or SCP. (As per FIG. 4, NRF1 is the local data center NRF, therefore it is a preferred NRF for the consumer NF)

No procedure is defined where an NF or SCP can determine a preferred NRF instance it should reselect if the primary NRF instance is down. The existing solution relies on Domain Name System, (DNS) (including possibly discovering all NRF instances within an NRF cluster with weight and priorities, common for all registering NFs or SCPs).

DNS may be used to point to one specific NRF (e.g., primary NRF) or a cluster of NRF instances. DNS supports weights and priorities, so an NRF consumer could discover an alternative NRF instance on its own when the NRF instance to which it is registered fails. However, operators are expected to provision a single FQDN with all the NRF instances addresses, for all NRF consumers, meaning this does not allow optimization of the selection (and reselection) of NRF instance based on each registering NRF consumer (e.g. based on locality or S-NSSAI of the registering NRF consumer).

Figure 5:
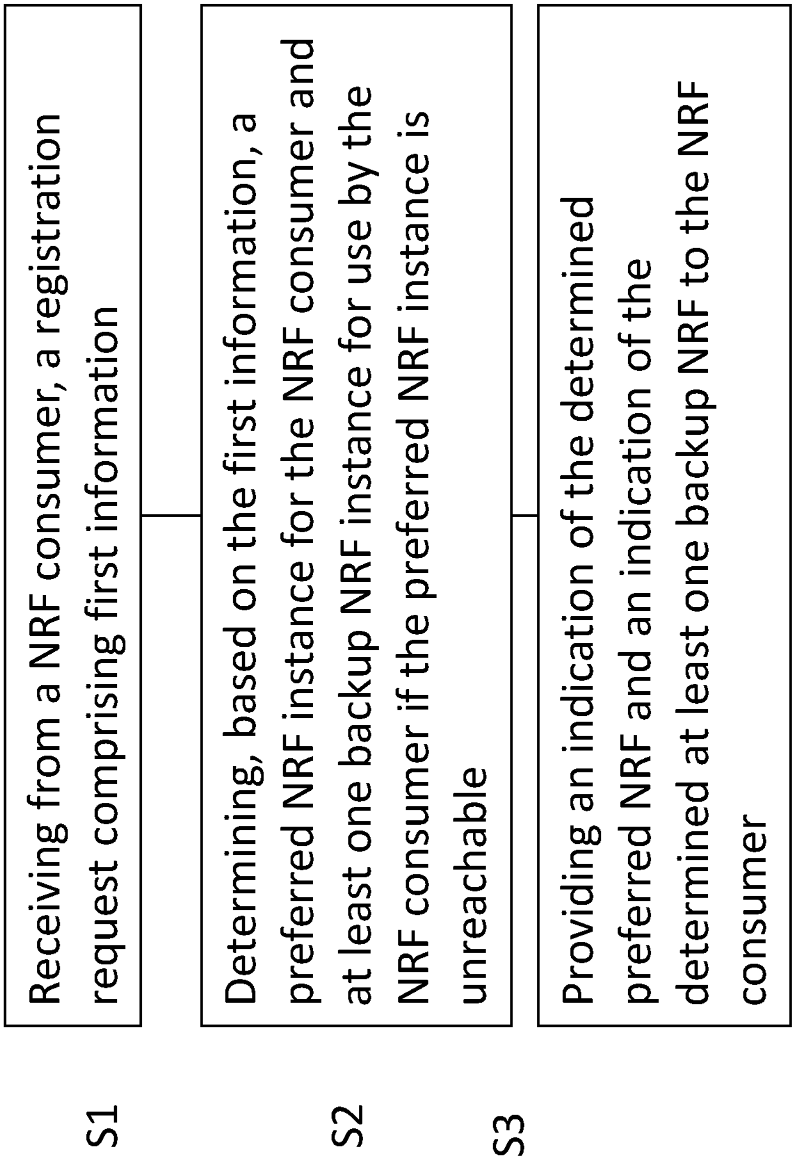
FIG. 5 shows a flowchart of a method according to an example embodiment.

FIG. 5 shows a flowchart of a method according to an example embodiment. The method may be performed at a NRF.

In a first step, S1, the method comprises receiving, from a NRF consumer, a registration request comprising first information.

In a second step, S2, the method comprises determining, based on the first information, a preferred NRF instance for the NRF consumer and at least one backup NRF instance for use by the NRF consumer if the preferred NRF instance is unreachable.

In a third step, S3, the method comprises providing an indication of the determined preferred NRF and an indication of the determined at least one backup NRF to the NRF consumer.

Figure 6:
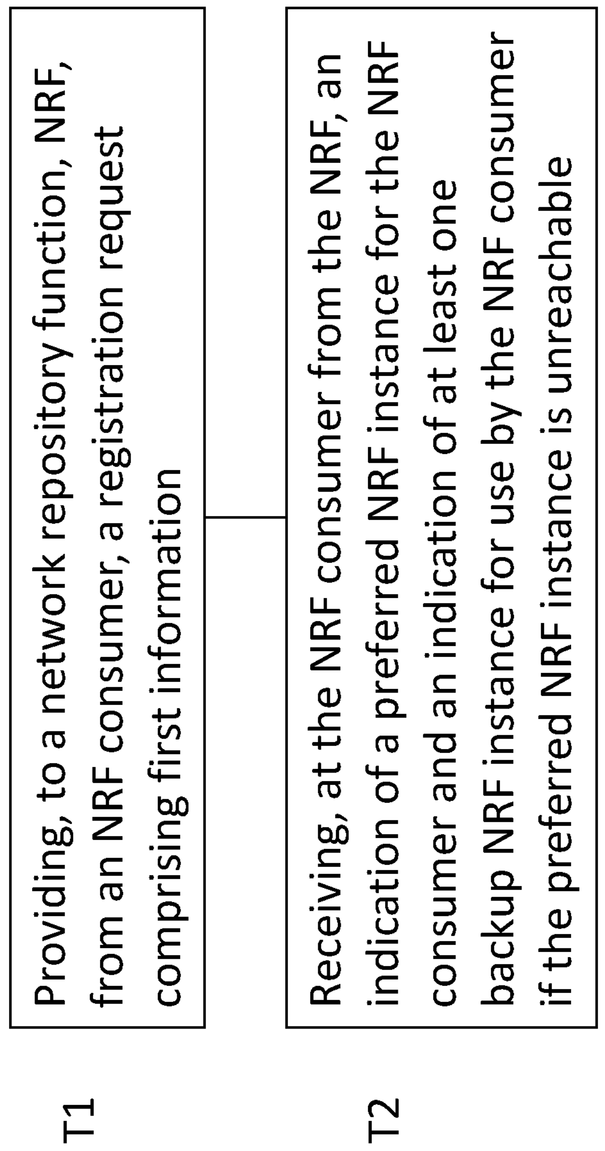
FIG. 6 shows a flowchart of a method according to an example embodiment.

FIG. 6 shows a flowchart of a method according to an example embodiment. The method may be performed at a NRF consumer such as a NF or SCP.

In a first step, T1, the method comprises providing, to a network repository function, NRF, from a NRF consumer, a registration request comprising first information.

In a second step, T2, the method comprises receiving, at the NRF consumer from the NRF, an indication of a preferred NRF instance for the NRF consumer and an indication of at least one backup NRF instance for use by the NRF consumer if the preferred NRF instance is unreachable.

The NRF consumer may be a NF or an SCP. The NF may be a NF service producer registering services exposed to other NFs, that behaves as an NF service consumer of the services exposed by the NRF e.g. to register the services the NRF produces.

The first information may comprise at least one of an indication of the locality or geographical location of the NRF consumer, an indication of the datacentre of the NRF consumer, an indication of the network slice of the NRF consumer and an indication of the NRF consumer type.

The method may comprise providing the indication of the determined preferred NRF and the indication of the determined at least one backup NRF to the NRF consumer in a HTTP header.

The HTTP header may be a new HTTP custom header or extended HTTP Binding headers.

The existing Binding header does not enable the NRF to indicate a preferred FQDN for subsequent request so the header is extended as described with reference to FIG. 7.

For example, in one variant, the preferred NRF and at least one backup NRF information may be signalled via new HTTP custom headers, e.g. as follows:

3gpp-Preferred-Nrf:
fqdn=nrf1.5gc.mnc345.mcc012.3gppnetwork.org
3gpp-Backup-Nrf:
fqdn=nrf2.5gc.mnc345.mcc012.3gppnetwork.org backupNRF contains the NRF instance to use when the preferred/current NRF instance is not available. preferred NRF contains the preferred NRF instance for Registration Update and Heartbeats.

The indication of the determined preferred NRF and the indication of the determined at least one backup NRF may comprise a fully qualified domain name. Alternatively, the indication of the determined preferred NRF and the indication of the at least one determined backup NRF may comprise an identifier of an NRF set comprising the preferred NRF and the at least one backup NRF.

For example, in one variant, the binding information may include an NRF Set ID, from which the NRF consumers derive the FQDN to use to contact alternative NRF instances:

3gpp-Sbi-Binding: bl=nfset;
nfset=nrfset1.5gc.mnc012.mcc345; scope=backup-nrf

The preferred and at least one backup NRFs share the NRF consumer profile data of all NRF consumers registered via any of the preferred and backup NRFs.

If the preferred NRF is not the NRF to which the registration request was sent, the method may comprise providing a registration request to the preferred NRF from the NRF consumer.

After registration the NRF consumer sends at least one of a heartbeat request ("Heartbeats") and a NRF consumer profile registration update ("update requests", "NF Register Updates" or "SCP Register Updates") to the preferred NRF. NRF consumer profile registration updates may be sent if and when the already registered profile needs to be updated In response to the at least one of a heartbeat request and a NRF consumer profile registration update, the preferred NRF may provide the indication of the determined preferred NRF and the indication of the at least one determined backup NRF to the NRF consumer.

The method as described with reference to FIG. 6 may comprise determining that the preferred NRF is unreachable and then sending at least one of a subsequent heartbeat request and a subsequent NRF consumer profile registration update from the NRF consumer to the backup NRF. The NRF consumer need not register its profile to the backup NRF since it was already registered with the primary NRF and the backup NRF either shares the NF profile contexts or has a copy of the profiles that were registered at the primary NRF.

In response to the heartbeat requests or NRF consumer profile registration updates sent from the NRF consumer to the backup NRF, the method may comprise receiving an indication at the NRF consumer from the back up NRF of a further backup NRF, a further preferred NRF or an indication that the backup NRF is now the preferred NRF.

The method may further comprise, in response to the heartbeat requests or NRF consumer profile registration updates, receiving a further indication of the preferred NRF from the backup NRF at the NRF consumer so that the NRF consumer is aware that the preferred NRF has become reachable and providing at least one of a subsequent heartbeat request and a subsequent NRF consumer profile registration update to the preferred NRF from the NRF consumer. In this case, the backup NRF determines that the preferred NRF is reachable and informs the NRF consumer by providing a further indication of the preferred NRF.

The method may provide support of the NRF set concept whereby multiple functionally equivalent and inter-changeable NRF instances form an NRF set. All NRF instances of the NRF set may share the same context data (i.e. registered NF profiles), as for an NF of an NF set, or each NRF may have specific backup NRF instances e.g. NRF instance1 is backed up by NRF instance 2 and NRF instance2 is backed up by NRF instance 3.

NRF instances in one NRF set may be deployed in different geographical locations. NRF consumers may be configured with one single NRF or NRF Set fqdn.

In one example embodiment, an NRF may send information to a NF about the preferred NRF instance and backup NRF instance via HTTP custom headers or extended HTTP Binding headers. The NRF selects the Preferred NRF instance for a given registering NF based e.g. on the locality or DataCenter of the registering NF, the Network Slice of the NF or other properties in the NF profile of the registering NF.

In this example embodiment, the NRF has control of where to redirect the NF service consumer for NRF selection, if the latter cannot reach the preferred (or primary) NRF for any reason (e.g. primary NRF failure).

Figure 7:
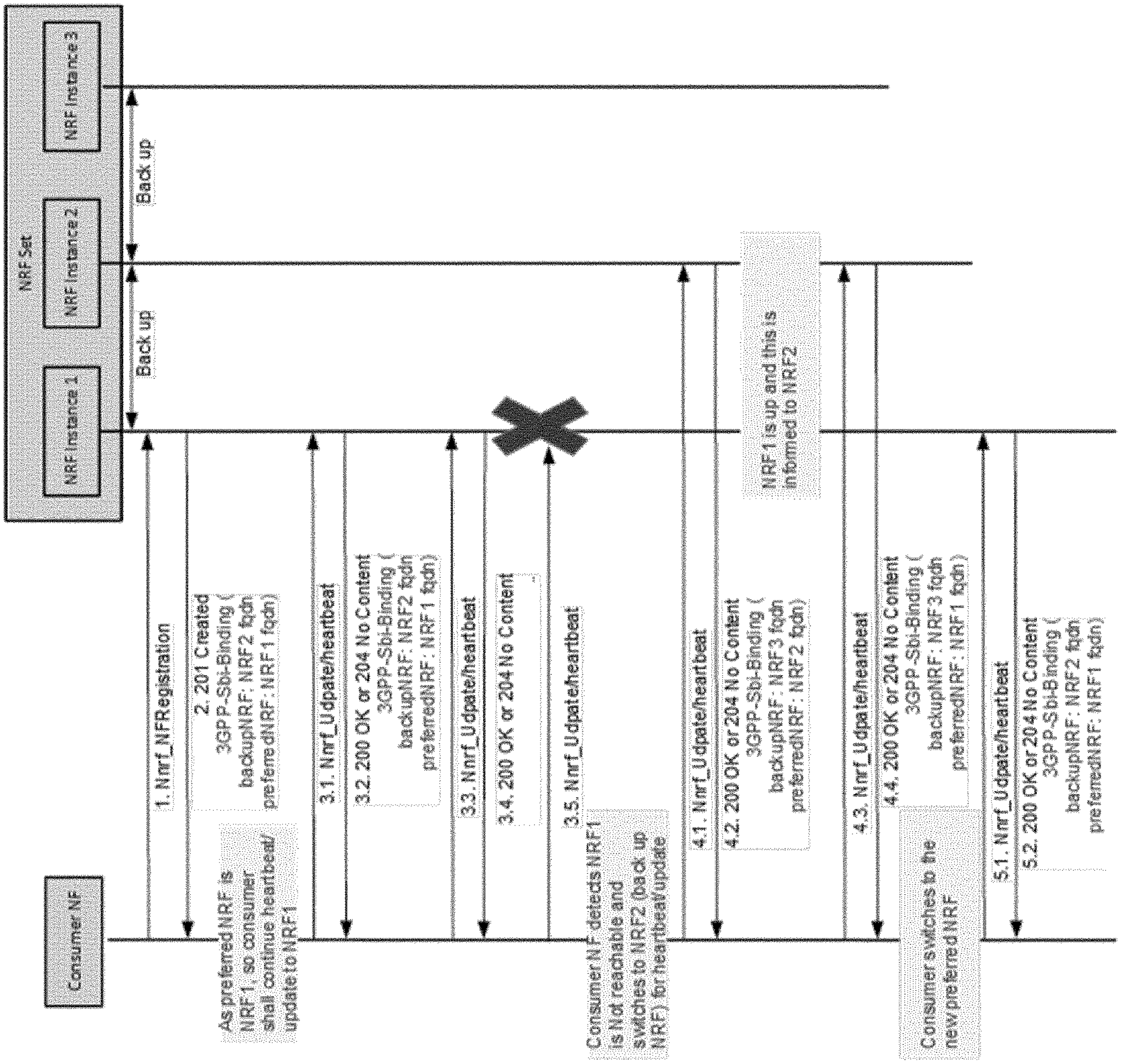
FIG. 7 shows a signalling flow according to an example embodiment.

FIG. 7 shows an example call flow between a NRF consumer NF and a NRF set comprising three NRF instances, NRFInstance1, NRFInstance2 and NRFInstance3.

Step 1 of FIG. 7 comprises the first-time registration of the NF. The NF is configured with one NRF or NRF Set fqdn, which resolves (using DNS) into one or more NRF instances. Then NF requests to register its NF profile to one NRF instance (NRF1 in the figure).

In step 2, once the Registration request is received at NRF1, the NRF1 determines the preferred NRF instance based, e.g. on locality or DC of the registering NF, on the Network Slice of the NF or other properties of the registering NF (the registering NF information such as locality or network slice is available in the NF profile received in the NF Register request).

If the NRF1 determines that it is the preferred NRF instance for the NF, then NRF1 accepts to register the NF profile and includes in its response the 3gpp-Sbi-Binding header (see clause 5.2.3.2.6 of TS 29.500) with information indicating that the preferred NRF is NRF1 and that the backup NRF is NRF2. The information may correspond e.g. to a scope value and FQDN parameter as follows:

3gpp-Sbi-Binding="3gpp-Sbi-Binding" ":" #(OWS "bl=" blvalue 1*(OWS ";" parameter))

blvalue="nfinstance"/"nfset"/"nfserviceinstance"/"nfserviceset"

parameter=parametername "=" token parametername="nfinst"/"nfset"/"nfservinst"/"nfserviceset"/"servname"/"scope"/"fqdn"

scope="other-service"/"callback"/"subscription-events"/"preferred-nrf"/"backup-nrf"

Example: Binding header signaling a preferred NRF instance and a backup NRF instance 3gpp-Sbi-Binding: bl=nfinstance; fqdn=nrf1.5gc.mnc345.mcc012.3gppnetwork.org; scope=preferred-nrf, bl=nfinstance; fqdn=nrf2.5gc.mnc345.mcc012.3gppnetwork.org; scope=backup-nrf If NRF1 determines that it is not the preferred NRF instance for the registering NF, then NRF1 redirects (HTTP 3xx redirection message) the requester NF towards another NRF instance, or accepts the registration request but includes in its response information that NRF 2 is a preferred NRF instance. In the former case, the requester NF registers again towards NRF2, in the latter case it simply sends subsequent Register Update and heartbeat requests towards NRF2.

In steps 3.1, 3.2, 3.3 and 3.4 the NF sends NF Register Update and heartbeat Request towards the preferred NRF instance, i.e. NRF1 in the example call flow. In its response, NRF1 may indicate the same preferred and backup NRF information (no change in the previous registration response header), as shown in the figure, or possibly different NRF information.

In step 3.5, the NF detects that NRF1 is not reachable. The NF s selects then the backup NRF from previously received backupNRF and switches to NRF2. The NF Service Consumer need NOT register its NF profile again in NRF2 since NRF2 and NRF are in the NRF set.

In steps 4.1 and 4.2, the NF sends heartbeat/Update requests to NRF 2. NRF2 knows if NRF1 is up or not. If NRF1 is not up, NRF2 includes in NF Register Update response or HeartBeat response a Binding indication or the new header with the preferred NRF indicating NRF2 and with the backupNRF indicating NRF3. As the preferred NRF points to NRF2, the NF continues sending heartbeat/Update requests to NRF2.

In steps 4.3 and 4.4, when NRF1 comes up, NRF2 is made aware (e.g., by implementation specific means). Accordingly, NRF2 starts indicating in NF Register Update Response and HeartBeat responses sent to the NF that the preferred NRF instance is NRF1 and that NRF2 serves as a backup NRF, by including a Binding indication or the new header with preferred NRF pointing to NRF1 and backupNRF pointing to NRF2.

In steps 5.1 and 5.2, the NF sends subsequent NF Register Update requests and HeartBeat Requests to NRF1. NRF1 may indicate in the response the same preferred and backup NRFs, i.e. preferred NRF pointing to NRF1 and backupNRF to NRF2.

The method may enable support of the NRF set concept, not requiring NRF consumers to register again their NF profile when the NRF where they had registered fails or becomes not reachable for any reason, and not causing any NF status change notifications towards NFs subscribed to be notified about NF service producers' changes.

The method may enable the NRF to determine the preferred NRF instance a specific NRF's consumer should be using for NF profile registration/registration update and for heartbeats, as well as possibly for NF discovery requests, based on the properties of the NRF consumer, e.g. locality, network slice, and the available NRF instances.

The method may enable the NRF to signal to the NRF consumer the preferred NRF instance and one (or more) backup NRFs if the preferred NRF instance becomes no longer reachable, and enables NRF consumers to be always updated with such information.

The method may remove the need for NRF consumers to monitor whether a primary NRF that failed is up again. Once the primary NRF is back into service, this is notified automatically to NF service consumers via binding information.

The method simplifies the operations in the network by removing the need for operators to provision every NRF consumer (e.g., every 5GC NF) with primary and secondary NRF instances.

The method may be implemented in a control apparatus as described with reference to FIG. 3.

An apparatus may comprise means for, at a network repository function, NRF, receiving, at a network repository function, NRF, from a NRF consumer, a registration request comprising first information, determining, based on the first information, a preferred NRF instance for the NRF consumer and at least one backup NRF instance for use by the NRF consumer if the preferred NRF instance is unreachable and providing an indication of the determined preferred NRF and an indication of the determined at least one backup NRF to the NRF consumer.

Alternatively, or in addition, an apparatus may comprise means for providing, to a network repository function, NRF, from an NRF consumer, a registration request comprising first information and receiving, at the NRF consumer from the NRF, an indication of a preferred NRF instance for the NRF consumer and an indication of at least one backup NRF instance for use by the NRF consumer if the preferred NRF instance is unreachable.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to LTE and 5GS, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various example embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Example embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

Indeed, there is a further embodiment comprising a combination of one or more embodiments with any of the other embodiments previously discussed.

The invention claimed is:

1. An apparatus comprising:

at least one processor; and at least one memory storing instructions of a network repository function (NRF) of a communication network, wherein the instructions, when executed by the at least one processor, cause the apparatus to perform operations, the operations comprising:

receiving, from a network repository function (NRF) consumer, a registration request for registration of a profile of the NRF consumer with the NRF, the registration request comprising first information, wherein the NRF consumer comprises a network function (NF) or a service communication proxy (SCP) of the communication network that consumes services of the NRF;

determining, based on the an indication of a data center hosting the NRF consumer, that the NRF is a preferred NRF of the communication network for the NRF consumer and that one or more other NRFs are to be one or more backup NRFs for the preferred NRF for use by the NRF consumer if the preferred NRF is unreachable by the NRF consumer;

providing, to the NRF consumer, NRF information that identifies the NRF is the preferred NRF for the NRF consumer and that identifies the one or more other NRFs that are backup NRFs to the NRF;

receiving, from the NRF consumer, a request comprising a heartbeat request or a registration update request for updating the registration of the profile of the NRF consumer; and sending, to the NRF consumer, a response to the request, the response indicating that the NRF is available.

2. The apparatus according to claim 1, wherein the determining is further based on at least one of: an indication of a network slice used by the NRF consumer to send the registration request, or an indication of the NRF consumer type, wherein the NRF consumer type indicates a type of NRF consumer.

3. The apparatus according to claim 1, wherein the response to the request comprises a hypertext transfer protocol message.

4. The apparatus according to claim 1, wherein the NRF information comprises a fully qualified domain name (FQDN) for the NRF and a respective FQDN for each of respective other NRF of the one or more other NRFs.

5. The apparatus according to claim 1, wherein the NRF information comprises an identifier of an NRF set comprising the NRF and the one or more other NRFs.

6. The apparatus according to claim 1, wherein in instance new NRF information is available after the providing the NRF information, the response to the request comprises the new NRF information, wherein the new NRF information identifies a first other NRF of the one or more other NRFs as the preferred NRF for the NRF consumer and a second other NRF of the one or more other NRFs as the backup NRF for the preferred NRF.

7. The apparatus according to claim 1, wherein the NRF and the one or more other NRFs share NRF consumer profile data with all NRF consumers registered with any of the NRF and the one or more backup NRFs.

8. The apparatus according to claim 1, wherein the determining is further based on a geographical location of the NRF consumer.

9. The apparatus according to claim 1, wherein the operations further comprises:

providing the profile of the NRF consumer to each respective other NRF of the one or more other NRFs for registration of the profile of the NRF consumer with the respective other NRF.

10. An apparatus comprising:

at least one processor; and at least one memory storing instructions of a Network Repository Function (NRF) consumer of a communication network, wherein the NRF consumer comprises a network function (NF) or a service communication proxy (SCP) of the communication network that consumes services of a NRF of the communication network, and wherein the instructions, when executed by the at least one processor, cause the apparatus to perform operations, the operations comprising:

providing, to the NRF, a registration request for registration of a profile of the NF consumer with the NRF, the registration request comprising first information; and receiving, from the NRF, a response to the registration request, the response comprising NRF information that identifies the NRF as a preferred NRF for the NRF consumer and that identifies one or more other NRFs as backup NRFs for the preferred NRF for use by the NRF consumer if the preferred NRF is unreachable;

sending, to the NRF, a heartbeat request or a registration update request;

determining that the NRF, which is the preferred NRF for the NRF consumer, is unreachable based on the heartbeat request or the registration update request;

after determining that the NRF is unreachable, sending to a first other NRF of the one or more other NRFs, a request comprising a heartbeat request or a registration update request for updating the registration of the profile of the NRF consumer; and receiving, from the first other NRF, a response to the request, the response indicating that the first other NRF is available and the response comprising new NRF information, wherein the new NRF information comprises an indication that the first other NRF is the preferred NRF for the NRF consumer and an identifier of a second other NRF of the one or more NRFs that is a backup NRF for the first other NRF which is the preferred NRF for the NRF consumer.

11. The apparatus according to claim 10, wherein the response to the request comprises a hypertext transfer protocol message.

12. The apparatus according to claim 10, wherein the NRF information comprises a fully qualified domain name (FQDN) for the NRF and a respective FQDN for each respective other NRF of the one or more other NRFs.

13. The apparatus according to claim 10, wherein the NRF information comprises an identifier of an NRF set comprising the NRF and the one or more other NRFs.

14. The apparatus according to claim 10, wherein the operations further comprise:

sending, to the first other NRF, a second request comprising a second heartbeat request or a second registration update request for updating the registration of the profile of the NRF consumer;

receiving, from the first other NRF, a second response to the second request, the second response comprising updated NRF information, the updated NRF information comprising an indication that the NRF is the preferred NRF for the NRF consumer.

15. The apparatus according to claim 14, wherein the operations further comprise:

sending, to the preferred NRF, a third request comprising a third heartbeat request or a third registration update request for updating the registration of the profile of the NRF consumer; and receiving, from the preferred NRF, a third response to the request, the third response indicating that the first backup NRF is available.

* * * * *